(12) United States Patent
Cunei (10) Patent No.: US 7,191,307 B1
(45) Date of Patent: Mar. 13, 2007

(54) MEMORY MANAGEMENT UNIT TECHNIQUE TO DETECT CROSS-REGION POINTER STORES

(75) Inventor: Antonio Cunei, West Lafayette, IN (US)

(73) Assignee: Sun Microsystems, Inc., Santa Clara, CA (US)

( * ) Notice: Subject to any disclaimer, the term of this patent is extended or adjusted under 35 U.S.C. 154(b) by 274 days.

(21) Appl. No.: 11/011,734

(22) Filed: Dec. 14, 2004

(51) Int. Cl.
G06F 9/35 (2006.01)
G06F 12/08 (2006.01)
G06F 12/00 (2006.01)

(52) U.S. Cl. .................... 711/203; 711/220; 707/206
(58) Field of Classification Search ............. 711/203, 711/220; 707/206
See application file for complete search history.

(56) References Cited

U.S. PATENT DOCUMENTS

| | | | |
|---|---|---|---|
| 4,775,932 A * | 10/1988 | Oxley et al. ............. | 707/206 |
| 5,845,298 A * | 12/1998 | O'Connor et al. ......... | 707/206 |
| 6,931,423 B2 * | 8/2005 | Sexton et al. ............. | 707/205 |

\* cited by examiner

*Primary Examiner*—Sue A. Purvis
*Assistant Examiner*—Tyler Willhite
(74) *Attorney, Agent, or Firm*—Osha Liang LLP (57) ABSTRACT

A method for detecting an invalid pointer including a source component and a target component, involving selecting a virtual source memory address for the source component wherein the virtual source memory address is within a first valid virtual address range, selecting a virtual target memory address for the target component wherein the virtual target memory address is within a second valid virtual address range, numerically combining the virtual source memory address and the virtual target memory address to obtain a new virtual source memory address, and writing the virtual target memory address into a memory location referenced by the new virtual source memory address, wherein writing the virtual target memory address triggers an action by a memory management unit (MMU) if the new virtual source memory address is an invalid memory location.

28 Claims, 6 Drawing Sheets

MEMORY MANAGEMENT UNIT TECHNIQUE TO DETECT CROSS-REGION POINTER STORES

BACKGROUND

Programming languages often use pointers, which are portions of memory that point to a memory address or block of memory. Memory is managed using commonly known management techniques. These techniques attempt to control the allocation of memory and to ensure that the main memory is shared fairly.

A typical system will provide a Memory Management Unit (MMU) that will manage the virtual memory space of the system. The MMU may be located on the central processing unit (CPU). In another embodiment, the MMU may be located on a separate chip. The MMU typically includes a table that maps virtual addresses to physical addresses. Further, the MMU may throw a trap if an attempt is made to access a virtual memory address that is not associated to a physical memory address. A process in memory may specify certain portions of memory to be used by the process. For example, instructions for the process may be located in one portion of memory and the data associated with or used by the process may be located in another portion of the memory (e.g., memory range). Ranges of memory used to store instructions or data may be write-protected, not allowing any new data to overwrite the existing memory content. The MMU may detect when a process attempts to write data to a protected memory region and throw a trap.

A commonly known memory management technique is garbage collection. Garbage collection may help optimize the use of the available memory by automatically freeing unused objects in a running program, and by avoiding common types of memory mismanagement. Garbage collection ensures that unused memory will be cleaned up and made available for other objects to use. A generational garbage collector may provide a grouping of objects based on age. An object that has been in use for certain period of time may be promoted to an older generation. The older generation objects are destroyed less frequently, therefore saving processing time during garbage collection.

Many applications (e.g., including garbage collectors) make use of pointers to link sets of elements (or objects) together (e.g., linked lists, trees, etc.). Occasionally, an application may restrict a pointer associated with one set of elements (e.g., Sx) from pointing to another set of elements (e.g., Sy). Restricting pointers in this manner allows the application to remain stable, avoid unpredictable results, protect the security of the information, and/or improve the performance of the computer system.

Currently, a few methods are available to determine whether a pointer associated with an element from Sx is illegally attempting to point to an element from Sy. One example is used in a generational garbage collector. Specifically, if a pointer is created, pointing from an object in the old generation to an object in the new generation, the event should be detected and treated specially. To detect the creation of such a pointer, the garbage collector is initially configured to allow an old generation object to be placed at a virtual address with a "small" high-byte value (e.g., 0, 1, etc.), whereas the new generation object may be placed at a virtual address with a "large" high-byte value (e.g., hexadecimal value E, hexadecimal value F, etc.). Next, a determination is made whether an old generation object is attempting to point to a new generation object, by masking off the high-byte value of the destination and comparing the high-byte value from the source to the destination. If the high-byte value from the source is less than the destination, then the special condition is detected and dealt with appropriately. Thus, by performing numerous comparisons to detect the creation of such special pointers, the integrity of the memory managed by the garbage collector is maintained.

SUMMARY

In general, in one aspect, the invention relates to a method for detecting an invalid pointer comprising a source component and a target component, comprising selecting a virtual source memory address for the source component wherein the virtual source memory address is within a first valid virtual address range, selecting a virtual target memory address for the target component wherein the virtual target memory address is within a second valid virtual address range, numerically combining the virtual source memory address and the virtual target memory address to obtain a new virtual source memory address, and writing the virtual target memory address into a memory location referenced by the new virtual source memory address, wherein writing the virtual target memory address triggers an action by a memory management unit (MMU) if the new virtual source memory address is an invalid memory location.

In general, in one aspect, the invention relates to a system for detecting an invalid pointer comprising a source component and target component of a valid pointer, wherein the source component and the target component are located in a specific memory region, a memory management unit configured to select a virtual source memory address for the source component wherein the virtual source memory address is within a first valid virtual address range and a virtual target memory address for the target component wherein the virtual target memory address is within a second valid virtual address range, and a new virtual source memory address obtained by numerically combining the virtual source memory address and the virtual target memory address, wherein writing the virtual target memory address triggers an action by a memory management unit (MMU) if the new virtual source memory address an invalid memory location.

In general, in one aspect, the invention relates to a computer readable medium comprising software instructions for detecting an invalid pointer comprising a source component and a target component, wherein the software instructions comprise functionality to select a virtual source memory address for the source component, wherein the virtual source memory address is within a first valid virtual address range, select a virtual target memory address for the target component, wherein the virtual target memory address is within a second valid virtual address range, numerically combine the virtual source memory address and the virtual target memory address to obtain a new virtual source memory address, and write the virtual target memory address into a memory location referenced by the new virtual source memory address, wherein writing the virtual target memory address triggers an action by a memory management unit (MMU) if the new virtual source memory address is an invalid memory location.

In general, in one aspect, the invention relates to a computer system for detecting a valid pointer comprising a source component and a target component, comprising a processor, a memory, a storage device, and software instructions stored in the memory for enabling the computer system under control of the processor to select a virtual source memory address for the source component, wherein the virtual source memory address is within a first valid virtual address range, select a virtual target memory address for the target component, wherein the virtual target memory address is within a second valid virtual address range, numerically combine the virtual source memory address and the virtual target memory address to obtain a new virtual source memory address, and write the virtual target memory address into a memory location referenced by the new virtual source memory address, wherein writing the virtual target memory address triggers an action by a memory management unit (MMU) if the new virtual source memory address is an invalid memory location.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In general, embodiments of the invention describe a method for determining the memory regions for which source and target components of a pointer belong. Further, embodiments of the invention provide a method for determining whether source-target combinations of the pointer are valid based on the memory region to which each component of the pointer belongs. In addition, embodiments of the invention provide a method that incorporates the use of a Memory Management Unit (MMU) to determine whether the source and target of the pointer, or their combinations, are valid.

Modern microprocessors may be broken into several distinct components. For example, a microprocessor may have an Arithmetic Logic Unit (ALU), a Memory Management Unit (MMU), a Program Counter (PC), an on chip cache, etc. Each component performs a specific function. For example, the ALU may perform a set of operations (e.g., addition, subtraction, bitwise AND, bitwise OR, sign extension, etc.) on logic vectors, as described below. Further, when all of the aforementioned components are combined within one unit, namely a microprocessor, these components may communicate with each other and provide a feature set (e.g., an addition operation, a subtraction operation, an input/output (I/O) features, a networking features, etc.) that may be used in many applications.

Microprocessors may perform operations on bits of data. These bits of data may be arranged as a logic vector. A logic vector may represent the binary form of a number, for example, a set of four logic lines may be a four-bit logic vector (e.g., four-bit binary number). Microprocessors may also perform an operation on one or more logic vectors. For example, the microprocessor may perform a bitwise AND using two of the logic vectors as inputs.

Further, microprocessors may provide a set of registers to store the logic vectors and a MMU to interface with Random Access Memory (RAM) or another type of memory (e.g., EPROM, Flash memory, etc.). The MMU is responsible for providing read and write requests to/from memory, converting virtual addresses to physical addresses, memory protection, etc. The MMU converts each virtual memory address from each process into a specific unique physical address. Memory protection may be used to prohibit a process of an application from writing to a specific range of memory addresses. For example, if the instructions for an application are located at memory addresses 0x00 to 0x0A, the MMU may prohibit storing data into those addresses.

Figure 1A:
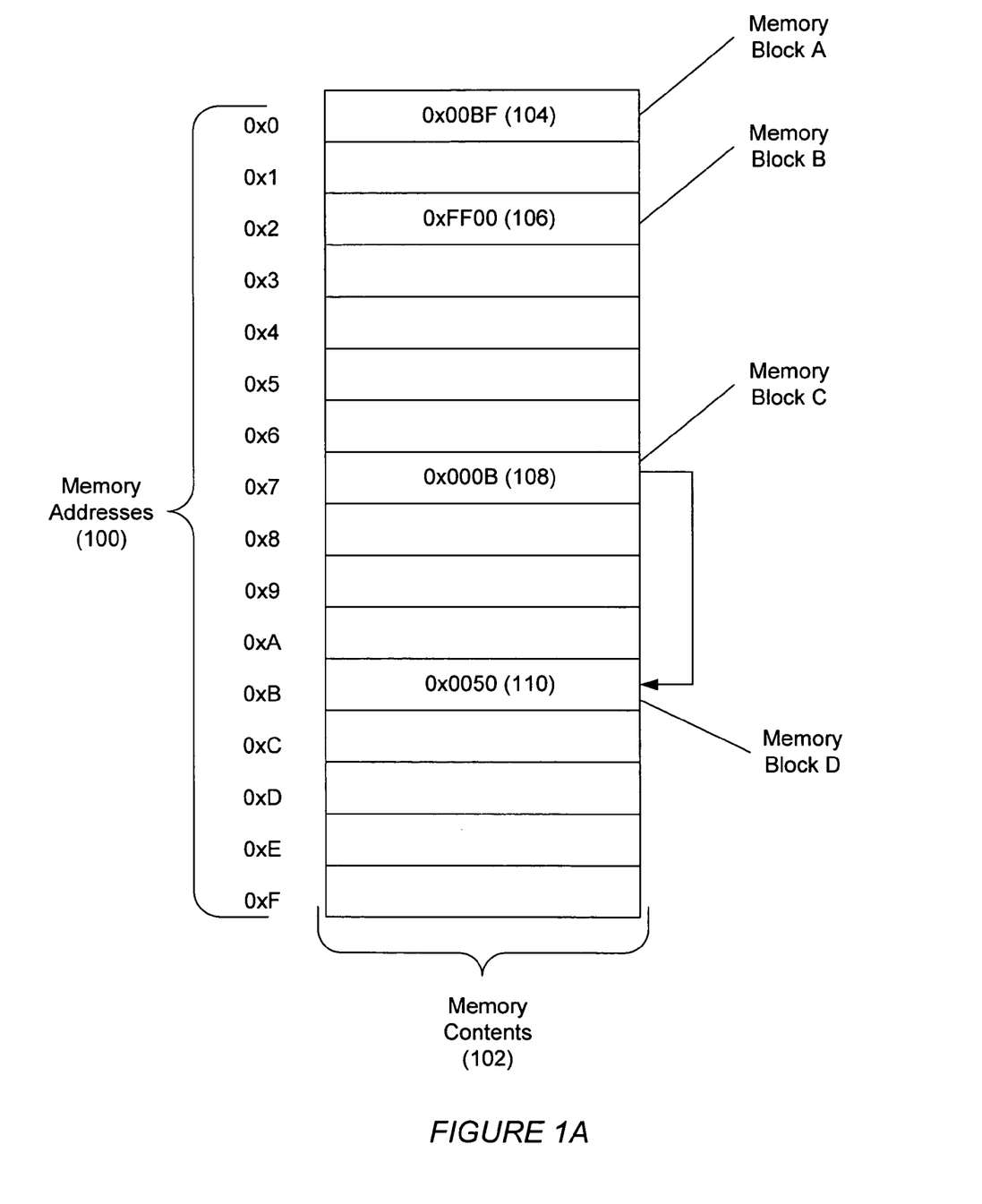
FIG. 1A shows a memory region in accordance with one embodiment of the invention.

In one embodiment of the invention, FIG. 1A illustrates a possible arrangement of memory addresses (100) and memory blocks (e.g., Memory Block A (104), Memory Block B (106), Memory Block C (108), and Memory Block D (110)) for a memory region (102). The memory region (102) includes sixteen blocks of memory, where each block of memory is two bytes. The memory addresses (100) range from 0x0 to 0xF. These values are hexadecimal numbers representing a four bit memory address. The four bits provide sixteen addresses thereby providing each memory block with a unique identifier. Because each memory block is two bytes, the contents of the memory block may be represented as a hexadecimal number of the form 0xXXXX, where each X represents a four bit number for a total of sixteen bits, or equivalently two bytes.

FIG. 1A also illustrates how a pointer is represented in memory. A pointer is made up of a source component (e.g., as shown by Memory Block C (108)) and a target component (e.g., as shown by Memory Block D (110)). The source component essentially points to the target component by storing the address of the target component in the memory block of the source component. In FIG. 1A, the object at memory address 0x7 (e.g., Memory Block C (108)) is the pointer source and the object at memory address 0xB (e.g., Memory Block D (110)) is the pointer target. The pointer source (e.g., 0x7) may point to the pointer target (e.g., 0xB) by storing the memory address of the pointer target (e.g., 0x000B) in the memory block of the pointer source. However, in one embodiment of the invention, the memory block may store more bits than the memory address. For example, as illustrated in FIG. 1A, the memory block is two bytes whereas the memory address is four bits. Therefore, when the address of the pointer target is stored in the memory block of the pointer source, several zero bits may be inserted (e.g., 0xB becomes 0x000B).

Figure 1B:
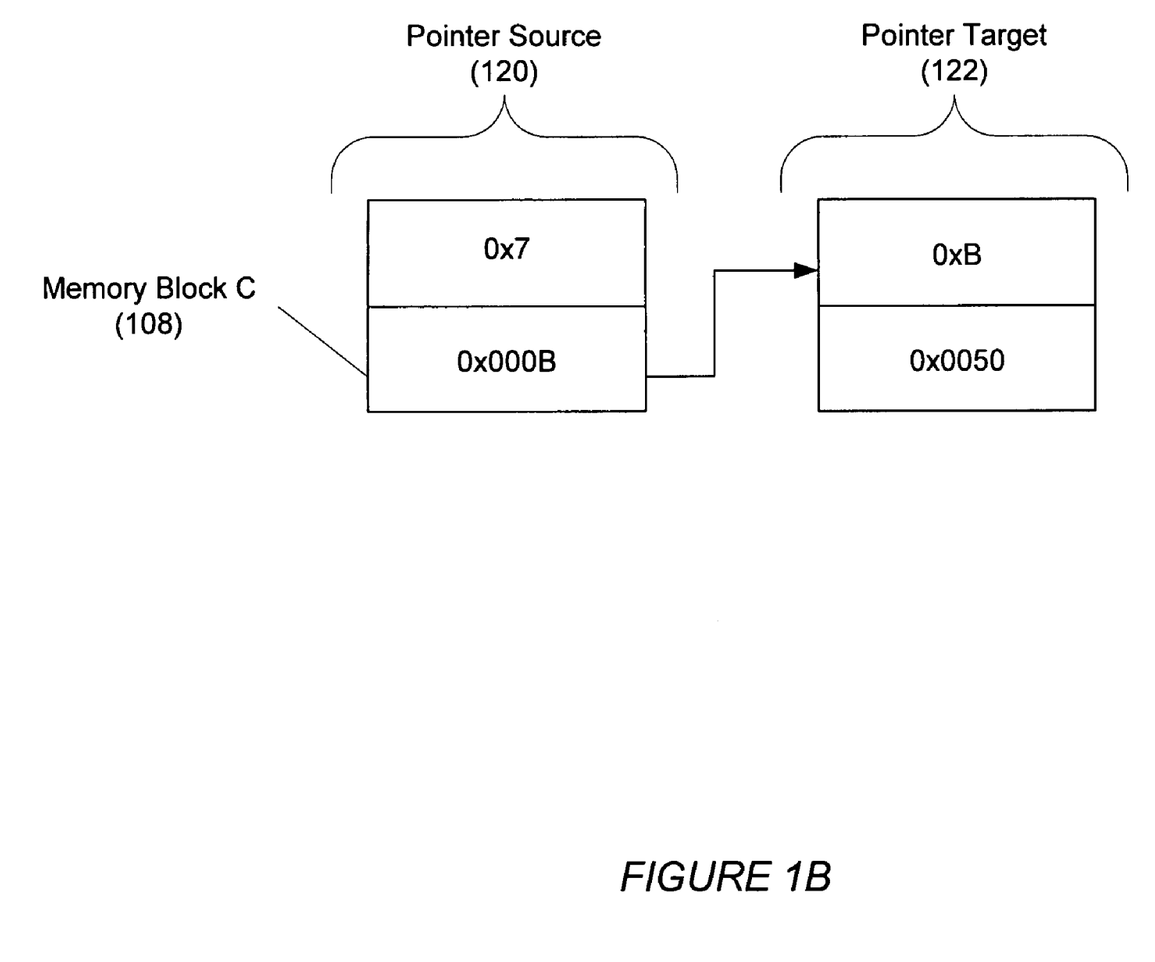
FIG. 1B shows a pointer in memory in accordance with one embodiment of the invention.

FIG. 1B illustrates an enlargement of the pointer from FIG. 1A. Specifically, a Pointer Source (120) is shown pointing to a Pointer Target (122). The pointer is created by storing the address (e.g., 0xB) of the Pointer Target (122) in the memory block (e.g., Memory Block C (108)) for the Pointer Source (120).

Figure 2:
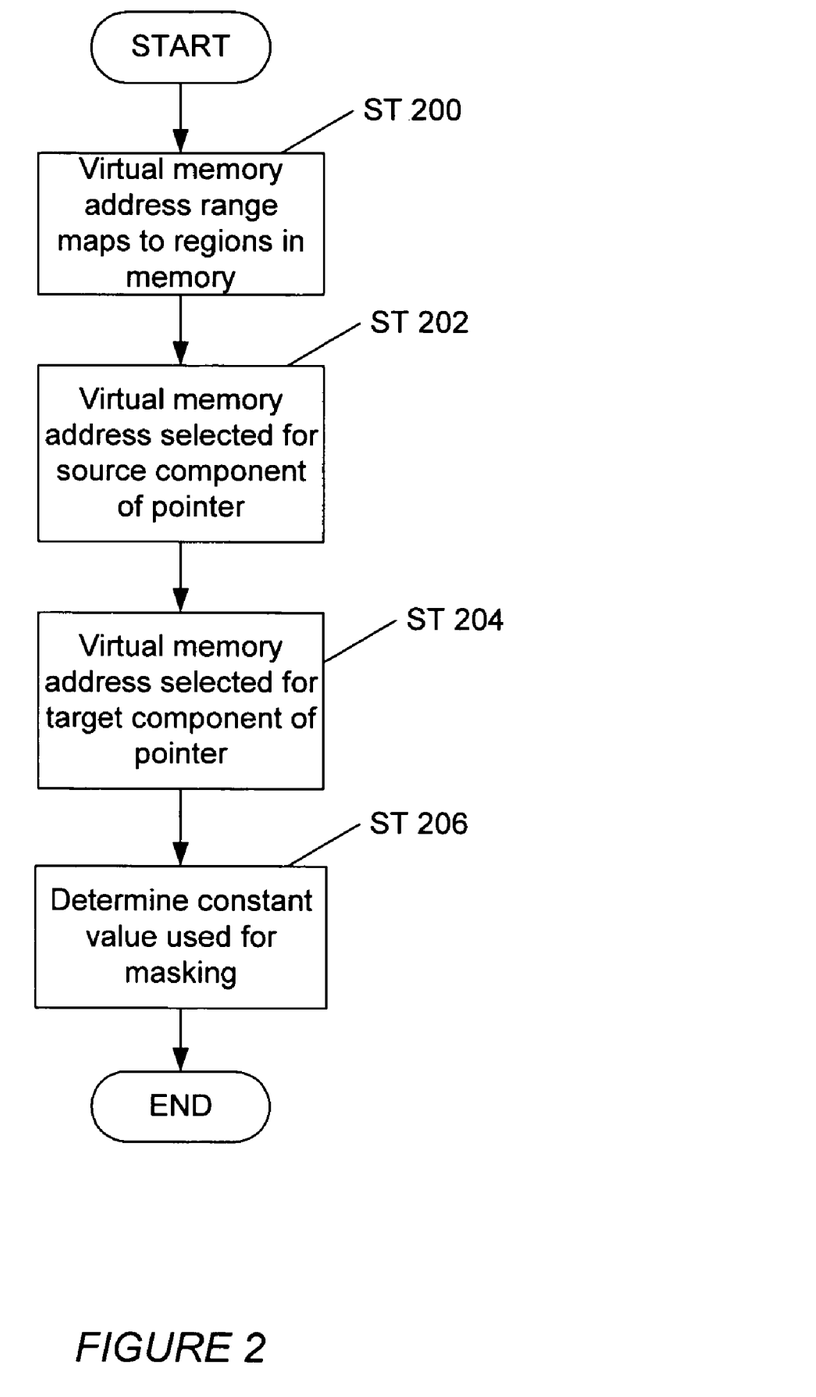
FIG. 2 shows a flowchart for memory initialization in accordance with one embodiment of the invention.

FIG. 2 illustrates a flow chart in accordance with one embodiment of the invention. More specifically, FIG. 2 shows a method for initializing a system to analyze the validity of a pointer. Initially, a virtual address range is mapped to each region in a memory associated with the system (ST 200). In one embodiment of the invention, a plurality of regions of physical memory (e.g., two or more regions of physical memory) may be defined, and each region of physical memory may be associated with one or more virtual address ranges. As discussed above, in one embodiment of the invention, the region of physical memory may have virtual addresses in the range of 0x0 to 0xF. However, many other virtual memory address ranges may be possible for a specific region of physical memory. For example, in another embodiment of the invention, the virtual address range may be of the form 0x4Bxxxxxx, where every four-byte hexadecimal number beginning with 4B maps to a specific region of physical memory (e.g., region 1, region 2, etc.). Once each region of physical memory has been mapped to one or more virtual memory ranges, objects (e.g., variables, pointer sources, pointer targets, etc.) may be stored in a specific region of physical memory by selecting a virtual memory address from one of the virtual memory address range associated with the corresponding region of physical memory. Those skilled in the art will appreciate that some physical memory and virtual memory may remain unmapped.

During program execution, a new pointer may be created. In order to create a pointer, two components may be provided, a source component and a target component. As described above for FIG. 1A, the memory block for the source component may store the memory address of the target component. Therefore, the source component is stored in memory and a virtual memory address is selected (e.g., "virtual source memory address") (ST 202). In addition, the target component is stored in memory and a virtual memory address is selected (e.g., "virtual target memory address") (ST 204). The number of bits required to form a virtual memory address may vary depending on the size of the memory region and the size of each block in the memory region. For example, in one embodiment of the invention, a memory region may be 32 bytes, and it may be advantageous to have two-byte memory blocks. Therefore, sixteen memory blocks fit in the 32 byte region, and the memory addresses are four bits. However, depending on the system, the MMU will select a virtual memory address with the necessary number of bits.

Next, in one embodiment of the invention, a constant is determined in order to properly mask the virtual target memory address (ST 206). The constant is determined using the virtual memory address range for each memory region mapped in step 200. The constant may be used to mask a portion of virtual memory address to assist in determining which memory region a virtual memory address belongs by checking specific bits in the virtual memory address.

Once each memory region is mapped to one or more virtual memory address spaces, a virtual memory address is selected for both the source and target components of a pointer, and the constant used to mask a virtual memory address is determined, the system is ready to determine if the combination is legal or not.

Figure 3:
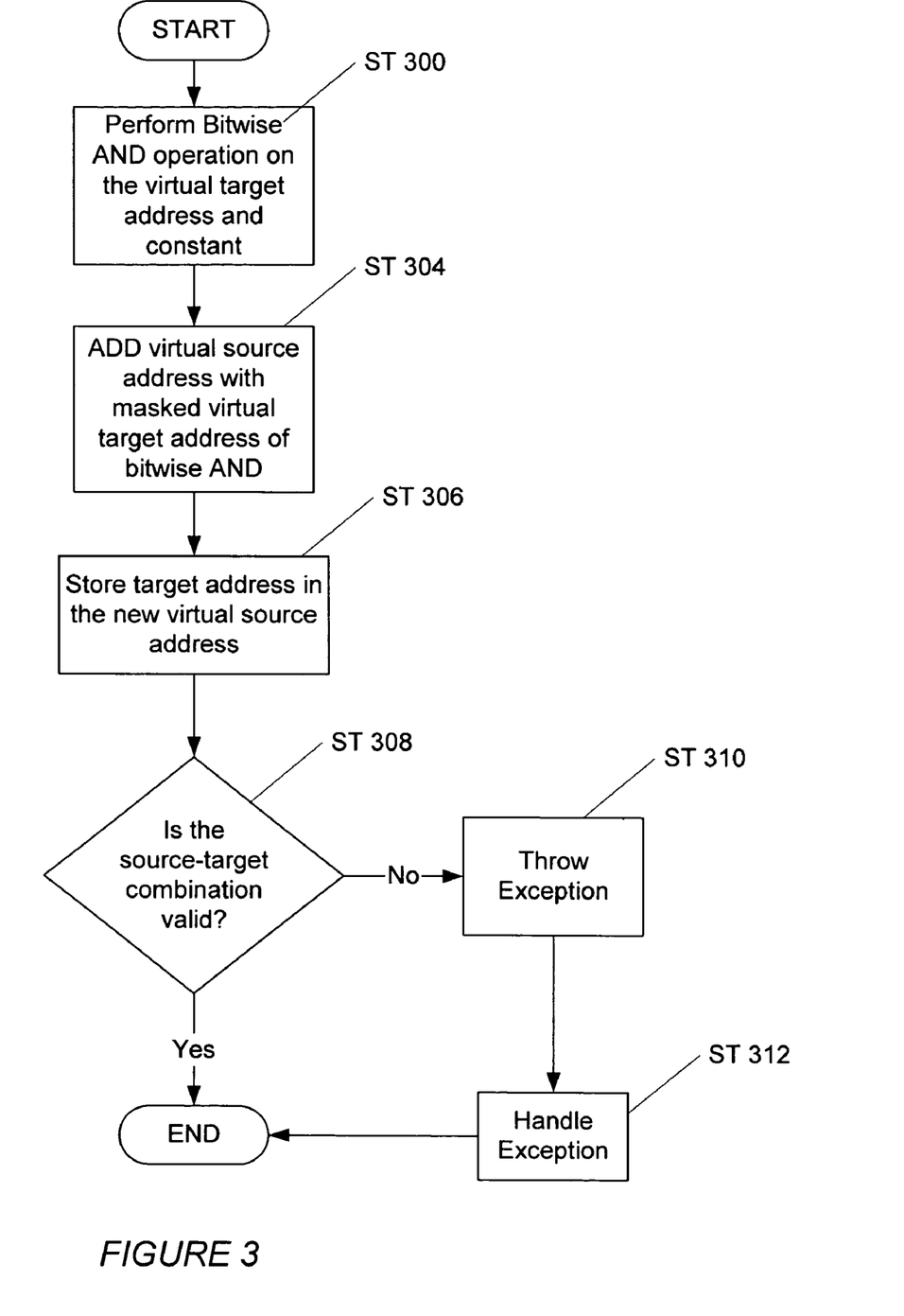
FIG. 3 shows a method to determine allowable components for a pointer in accordance with one embodiment of the invention.

FIG. 3 illustrates a method to use the MMU along with the CPU to detect illegal combinations of source and target address instead of only using the CPU. Initially, the two components (e.g., the source component and the target component) of a pointer are defined and a valid virtual memory address (e.g., as described in the method from FIG. 2) is selected for each component. In one embodiment of the invention, to assist in determining within which memory region each component belongs, the microprocessor masks a portion of the virtual target memory address by performing the bitwise AND operation on the virtual target memory address and the previously determined constant to obtain a masked target memory address (ST 300).

The mappings between the physical memory regions and the virtual address ranges are chosen, and set in the internal MMU structures. As discussed above, the constant that is used is carefully determined based on the one or more virtual memory address ranges chosen for each memory region. Specifically, in one embodiment of the invention, the constant is chosen to align the new virtual memory source address with either an equivalent valid memory location or an invalid memory location. The masked target memory address may be added to the virtual source memory address (ST 304) to obtain a new virtual source memory address. For example, a memory region may be mapped with two virtual address spaces, 0xC0xxxxxx and 0x40xxxxxx. The constant may be determined so that when the masked memory address is added to a virtual memory address from either virtual memory address region that it may end up at the equivalent location in the other virtual memory address region, the same memory address, or an invalid memory address (e.g., three possible mutually exclusive outcomes of the operation are: 0xC0000002 added with masked target memory address evaluates to 0x4000002, 0xC000002 added with masked target memory address evaluates to 0xC000002, and 0xC000002 added with masked target memory address evaluates to an invalid memory address).

In one embodiment of the invention, once the new virtual source memory address is calculated, a write operation occurs that places the virtual target memory address at the memory location referenced by the new virtual source memory address (ST 306). During the write operation, the MMU detects if the source-target combination is valid (ST 308). If the combination of the source and target is invalid, the MMU throws an exception (ST 310). The MMU determines whether an exception should be thrown by determining whether the new virtual source memory address is within an invalid virtual memory region (e.g., an unmapped memory address or a write protected memory address). In one embodiment of the invention, the exception may be thrown because the new virtual source memory address is not mapped to a physical memory location, or the new virtual source memory address may be write-protected. If the address is write-protected, no new data can overwrite the current data at that address. Using the MMU to detect whether a memory address is out of range may result in a smaller number of instructions executed because the MMU may perform the test while the memory is being accessed. If an exception is thrown, the exception is handled (ST 312) with an Exception Handler. In one embodiment of the invention, the Exception Handler may be a function that displays a message detailing that an illegal access was attempted.

Figure 4:
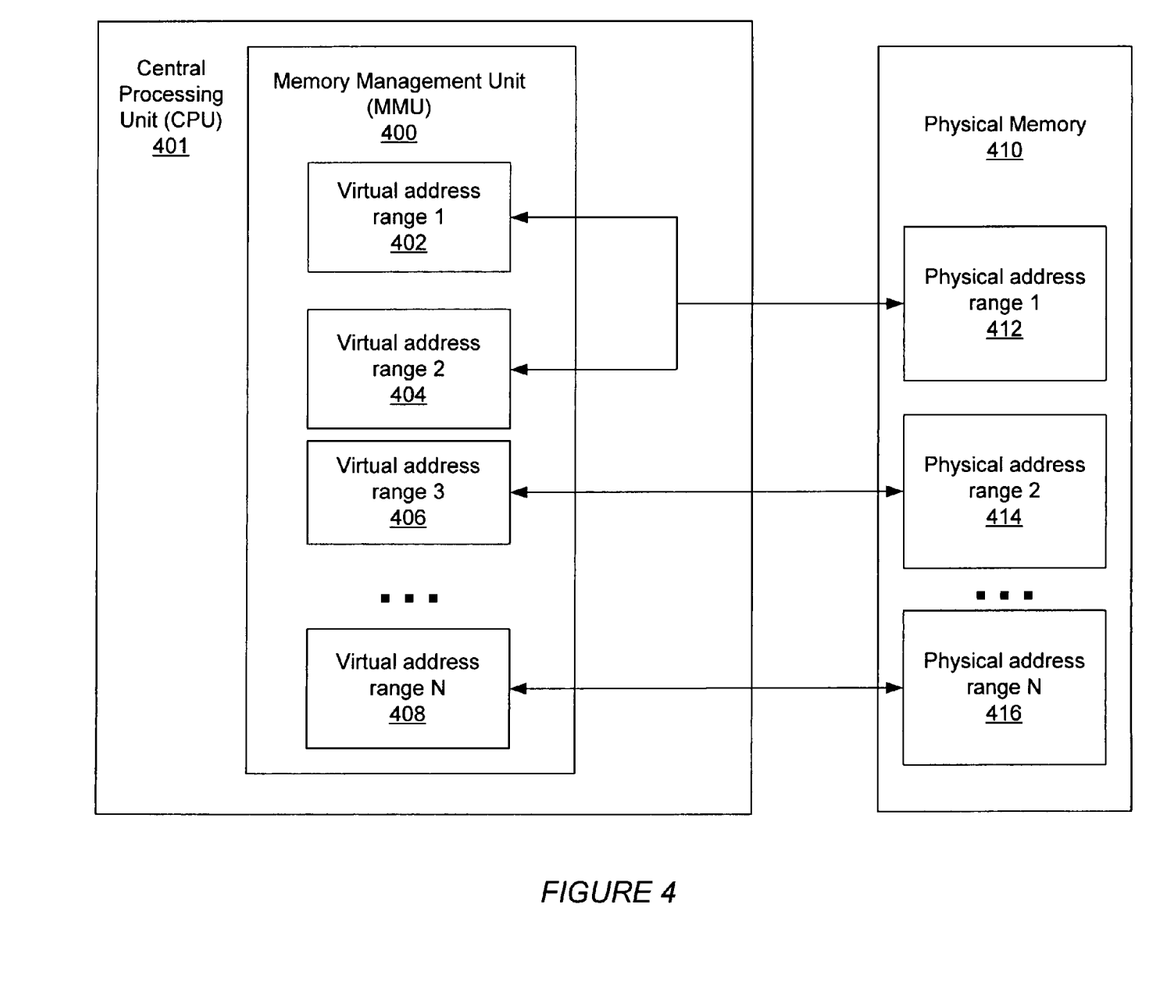
FIG. 4 shows a virtual memory address range mapping to a physical memory range in accordance with one embodiment of the invention.

FIG. 4 illustrates a system that may use a pointer in which each component of the pointer is located in a specific memory region. In accordance with one embodiment of the invention, FIG. 4 includes an MMU (400) that may be part of a Central Processing Unit (CPU) (401). In one embodiment of the invention, the MMU (400) may provide a mapping of the plurality of virtual memory address ranges (e.g., virtual memory address range 1 (402), virtual memory address range 2 (404), virtual memory address range 3 (406), and virtual memory address range N (408)). In one embodiment of the invention, one or more virtual memory address ranges may map to the same physical address range (e.g., virtual address range 1 (402) and virtual address range 2 (404) both map to physical address range 1 (412), virtual memory address range 3 (406) maps to physical address range 2 (414), virtual memory address range N (408) maps to physical address range N (416)). In one embodiment of the invention, the physical address ranges (e.g., physical address range 1 (412), physical address range 2 (414), and physical address range N (416)) are all located in physical memory (410).

In accordance with one embodiment of the invention, the following example demonstrates the method described above. In a generational garbage collector, several regions may be defined in memory. In this example, two regions are defined, a new region and an old region. In this generational garbage collector, a special action is taken upon the creation of the pointer for objects in the old region that point to any objects in the new region. The MMU maps the virtual address range of 0x3Fxxxxxx to the old region. In addition, the MMU maps two virtual address ranges to the new region, specifically 0x40xxxxxx and 0xC0xxxxxx. Based on these regions, a constant is determined that is used to mask a portion of the virtual target memory address. In this example, the constant value is 0x80000000 because when that value is used for masking, the result of the addition with the virtual source memory address is a valid virtual memory address if the pointer combination is allowable. However, if the combination is not allowable, an invalid virtual source memory address is obtained.

With the regions defined as described above, several combinations are possible for the components of an attempted pointer. First, the source component of the pointer may be from the new region (e.g., virtual memory address range 0x40xxxxxx) and the target component of the pointer may also be from the new region (e.g., virtual memory address range 0xC0xxxxxx). Second, the source component of the pointer may be from the old region (e.g., virtual memory address range 0x3Fxxxxxx) and the target component of the pointer may be from the new region (e.g., virtual memory address range 0xC0xxxxxx), however this would be considered an invalid combination. Third, the source component of the pointer may be from the old region (e.g., virtual memory address range 0x3Fxxxxxx) and the target component of the pointer may be from the old region (e.g., virtual memory address range 0x3Fxxxxxx). Lastly, the source component of the pointer may be from the new region (e.g., virtual memory address range 0xC0xxxxxx), and the target component of the pointer may be from the old region (e.g., virtual memory address range 0x3Fxxxxxx). In this example, the constant is aligned so that the virtual source memory address range may originally be 0xC0xxxxxx. Table 1 shows the possible combinations, described above.

TABLE 1

| Source Address | Target Address Range | Result |
| --- | --- | --- |
| 0xC0xxxxxx | 0xC0xxxxxx | New->New |
| 0xC0xxxxxx | 0x3Fxxxxxx | New->Old |
| 0x3Fxxxxxx | 0xC0xxxxxx | Old->New |
| 0x3Fxxxxxx | 0x3Fxxxxxx | Old->Old |

In Table 1, above, four possible combinations of the source and target components are shown. One of those four combinations is invalid (e.g., the combination that result in Old→New). Using the method described above and shown in FIG. 3, a determination is made whether or not the combination is allowable with an efficient use of the MMU. Applied to this example, the microprocessor may first perform a bitwise AND operation on the virtual target memory address and the specified constant (e.g., 0x80000000) to obtain a masked target memory address. Next, the masked target memory address is added with the virtual source memory address to obtain a new virtual source memory address. The results of these operations are shown below in Table 2.

TABLE 2

| Source Address | Target Address | Masked Target Address | New source Address |
| --- | --- | --- | --- |
| 0xC0xxxxxx | 0xC0xxxxxx | 0x80000000 | 0x40xxxxxx |
| 0xC0xxxxxx | 0x3Fxxxxxx | 0x00000000 | 0xC0xxxxxx |
| 0x3Fxxxxxx | 0xC0xxxxxx | 0x80000000 | 0xBFxxxxxx |
| 0x3Fxxxxxx | 0x3Fxxxxxx | 0x00000000 | 0x3Fxxxxxx |

As described above, the result of adding the masked target memory address with the virtual source memory address is either a valid virtual memory address or an invalid virtual memory address. If the result (e.g., the new virtual source memory address) is an invalid virtual memory address, then the source component and the target component are not an allowable combination. In this example, an object from the old region is not allowed to point to an object in the new region. Therefore, when the value of the new virtual source memory address is 0xBFxxxxxx, an invalid memory address results. However, the value of the new virtual source memory address for the other three combinations is valid.

The above example described one embodiment of the invention. In another embodiment of the invention, different types of calculations (e.g., subtraction, bitwise OR, etc.) may be applied to the source and target addresses, as long as the calculated address may be used to store the target address at the memory location for the source address.

Figure 5:
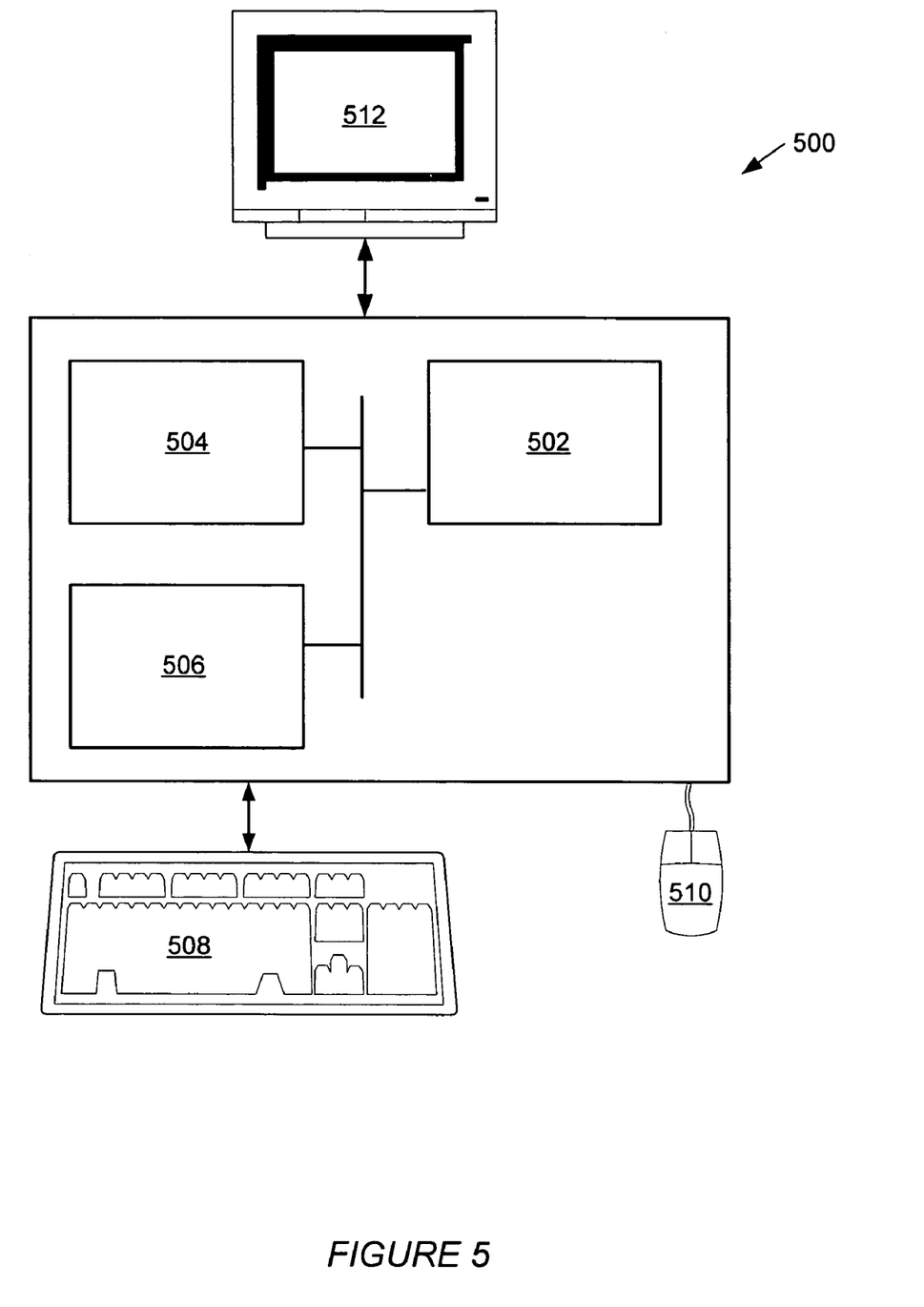
FIG. 5 illustrates a typical computer with components in accordance with one embodiment of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Further, software instructions to perform embodiments of the invention may be stored on a computer readable medium such as a compact disc (CD), a diskette, a tape, or any other computer readable storage device. A person of ordinary skill in the art will appreciate that these input and output means may take other forms.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for detecting an invalid pointer comprising a source component and a target component, comprising:
    selecting a virtual source memory address for the source component wherein the virtual source memory address is within a first valid virtual address range;
    selecting a virtual target memory address for the target component wherein the virtual target memory address is within a second valid virtual address range;

numerically combining the virtual source memory address and the virtual target memory address to obtain a new virtual source memory address; and writing the virtual target memory address into a memory location referenced by the new virtual source memory address, wherein writing the virtual target memory address triggers an action by a memory management unit (MMU) if the new virtual source memory address is an invalid memory location.

2. The method of claim 1, wherein numerically combining the virtual source memory address and the virtual target memory address comprises:
   masking a portion of the virtual target memory address to obtain a masked target memory address; and
   adding the virtual source memory address with the masked target memory address to obtain the new virtual source memory address.

3. The method of claim 2, wherein masking the portion of the virtual target memory address uses a specified constant value.

4. The method of claim 1, wherein the action taken by the MMU comprises throwing an exception, wherein the exception is handled by an exception handler.

5. The method of claim 1, wherein the invalid memory location is at least one selected from the group consisting of an unmapped memory location and a write-protected memory location.

6. The method of claim 1, wherein the virtual source memory address and the virtual target memory address are mapped to a single physical memory region.

7. The method of claim 1, wherein the first valid memory address range and the second valid memory address range are mapped to a single region of physical memory.

8. A system for detecting an invalid pointer comprising:
   a source component and target component of a valid pointer, wherein the source component and the target component are located in a specific memory region;
   a memory management unit configured to select:
      a virtual source memory address for the source component wherein the virtual source memory address is within a first valid virtual address range, and
      a virtual target memory address for the target component wherein the virtual target memory address is within a second valid virtual address range; and
   a new virtual source memory address obtained by numerically combining the virtual source memory address and the virtual target memory address, wherein writing the virtual target memory address triggers an action by a memory management unit (MMU) if the new virtual source memory address an invalid memory location.

9. The system of claim 8, wherein numerically combining the virtual source memory address and the virtual target memory address comprises:
   masking a portion of the virtual target memory address to obtain a masked target memory address; and
   adding the virtual source memory address with the masked target memory address to obtain the new virtual source memory address.

10. The system of claim 9, wherein a specified constant value is used to mask the portion of the virtual target memory address.

11. The system of claim 8, wherein the action taken by the MMU comprises throwing an exception, wherein the exception is handled by an exception handler.

12. The system of claim 8, wherein the invalid memory location is at least one selected from the group consisting of an unmapped memory location and a write-protected memory location.

13. The system of claim 8, wherein the virtual source memory address and the virtual target memory address are mapped to a single physical memory region.

14. The system of claim 8, wherein the first virtual address range and the second virtual address range are mapped to a single region of physical memory.

15. A computer readable medium comprising software instructions for detecting a invalid pointer comprising a source component and a target component, wherein the software instructions comprise functionality to:
   select a virtual source memory address for the source component wherein the virtual source memory address is within a first valid virtual address range;
   select a virtual target memory address for the target component wherein the virtual target memory address is within a second valid virtual address range;
   numerically combine the virtual source memory address and the virtual target memory address to obtain a new virtual source memory address; and
   write the virtual target memory address into a memory location referenced by the new virtual source memory address, wherein writing the virtual target memory address triggers an action by a memory management unit (MMU) if the new virtual source memory address is an invalid memory location.

16. The computer readable medium of claim 15, wherein numerically combining the virtual source memory address and the virtual target memory address comprises:
   masking a portion of the virtual target memory address to obtain a masked target memory address; and
   adding the virtual source memory address with the masked target memory address to obtain the new virtual source memory address.

17. The computer readable medium of claim 16, wherein a specified constant value is used to mask the portion of the virtual target memory address.

18. The computer readable medium of claim 15, wherein the action taken by the MMU comprises throwing an exception, wherein the exception is handled by an exception handler.

19. The computer readable medium of claim 15, wherein the virtual source memory address and the virtual target memory address are mapped to a single physical memory region.

20. The computer readable medium of claim 15, wherein the invalid memory location is at least one selected from the group consisting of an unmapped memory location and a write-protected memory location.

21. The computer readable medium of claim 15, wherein the first virtual address range and the second virtual address range are mapped to a single region of physical memory.

22. A computer system for detecting a valid pointer comprising a source component and a target component, comprising:
   a processor;
   a memory;
   a storage device; and
   software instructions stored in the memory for enabling the computer system under control of the processor to:
      select a virtual source memory address for the source component wherein the virtual source memory address is within a first valid virtual address range;
      select a virtual target memory address for the target component wherein the virtual target memory address is within a second valid virtual address range;

numerically combine the virtual source memory address and the virtual target memory address to obtain a new virtual source memory address; and write the virtual target memory address into a memory location referenced by the new virtual source memory address, wherein writing the virtual target memory address triggers an action by a memory management unit (MMU) if the new virtual source memory address is an invalid memory location.

23. The computer system of claim 22, wherein numerically combining the virtual source memory address and the virtual target memory address comprises:

masking a portion of the virtual target memory address to obtain a masked target memory address; and adding the virtual source memory address with the masked target memory address to obtain the new virtual source memory address.

24. The computer system of claim 23, wherein a specified constant value is used to mask the portion of the virtual target memory address.

25. The computer system of claim 22, wherein the action taken by the MMU comprises throwing an exception, wherein the exception is handled by an exception handler.

26. The computer system of claim 22, wherein the invalid memory location is at least one selected from the group consisting of an unmapped memory location and a write protected memory location.

27. The computer system of claim 22, wherein the virtual source memory address and the virtual target memory address are mapped to a single physical memory region.

28. The computer system of claim 22, wherein the first virtual address range and the second virtual address range are mapped to a single region of physical memory.

* * * * *